United States Patent
Frerichs et al.

(10) Patent No.: US 6,522,289 B1
(45) Date of Patent: Feb. 18, 2003

(54) METHOD AND DEVICE FOR PRODUCING A PULSE TRAIL

(75) Inventors: Wilfried Frerichs, Bremen (DE); Peter Stockigt, Weyhe-Leeste (DE)

(73) Assignee: STN Atlas Marine Electronics GmbH, Hamburg (DE)

( * ) Notice: Subject to any disclaimer, the term of this patent is extended or adjusted under 35 U.S.C. 154(b) by 0 days.

(21) Appl. No.: 09/806,377

(22) PCT Filed: Mar. 8, 1999

(86) PCT No.: PCT/EP99/01475
§ 371 (c)(1),
(2), (4) Date: Jun. 20, 2001

(87) PCT Pub. No.: WO00/19232
PCT Pub. Date: Apr. 6, 2000

(30) Foreign Application Priority Data

Sep. 29, 1998 (DE) .......................... 198 44 620

(51) Int. Cl.[7] .................................. G01S 7/04
(52) U.S. Cl. .................. 342/176; 342/175; 342/195
(58) Field of Search .................. 342/41, 175, 176–186, 342/195, 52, 55

(56) References Cited

U.S. PATENT DOCUMENTS

| | | | |
|---|---|---|---|
| 3,697,986 A | * 10/1972 | Colby | 342/41 |
| 3,742,494 A | * 6/1973 | Embling et al. | 342/55 |
| 3,803,596 A | * 4/1974 | Embling | 342/55 |
| 3,882,502 A | * 5/1975 | Peabody et al. | 342/176 |
| 4,162,494 A | * 7/1979 | Bacon | 342/181 |
| 4,208,657 A | * 6/1980 | Bryden et al. | 342/182 |
| 4,580,164 A | * 4/1986 | Andrieu et al. | 342/185 X |
| 4,829,308 A |   5/1989 | Tol et al. | 342/185 |
| 5,459,472 A |   10/1995 | Giraudy | 342/176 |

FOREIGN PATENT DOCUMENTS

DE 2924176 12/1980

* cited by examiner

Primary Examiner—Bernarr E. Gregory
(74) Attorney, Agent, or Firm—White & Case LLP

(57) ABSTRACT

The invention relates to a method for producing a pulse trail for at least one target whose actual position is represented in a continuous manner in a radar image of a radar device. In order to improve said method, wherein the pulse trails are represented on the radar screen in a highly visible manner for a viewer without any overcrowding of the radar screen when a plurality of targets that should be displayed simultaneously are present, the actual target position can be seen by means of a plurality of pixels that cover a continuous surface of the radar image and prior target positions are represented by a thinning out of said pixels that increases according to the chronological status of the respective target positions in the area.

13 Claims, 3 Drawing Sheets

METHOD AND DEVICE FOR PRODUCING A PULSE TRAIL

BACKGROUND OF THE INVENTION

The invention relates to a method and an apparatus for producing a persistence trail for at least one target whose respective current position is represented in a continuous manner in a radar image of a radar instrument.

Such persistence trails which are produced on the radar screen in a manner assigned to individual targets describe the tracks of located targets on the radar image, from which an observer can distinguish the movement behavior of the targets and also recognize collision risks evident from the directions of movement and eliminate them by suitable maneuvers instigated by said observer.

In a known method of this type (DE 29 24 176 C2), the radar echoes of the current panorama sample and of a plurality of preceding panorama samples, after storage in a single image memory, are displayed on the screen of the radar instrument. The image memory used is a read/write memory which is oriented in x,y coordinates and in which storage is performed by storing the intensities of the radar echoes currently received in each case in successive samples of the panorama, with the memory addresses corresponding to their spatial coordinates. The intensities obtained from previous samples are preserved in this case. The image content of the image memory is read out independently of the chronological order of reception of the radar echoes and represented on the radar image. As a result, the intensities stored for successive panorama samples appear strung together on the screen and describe the tracks or the persistence trails of the targets.

In a further configuration of the known method, the stored intensities are reduced by one or more increments after a predeterminable number of panorama samples, as a result of which the preceding target positions are represented on the screen with an intensity that decreases with age. The length of the persistence trails is thus dependent not only on the target speed but also on the speed with which a complete panorama sample is effected, and thus allows the time interval for which the persistence trail is represented to be assigned to the length of the persistence trail only in the case of a constant rotational speed of the radar antenna. If the rotational speed is changed, the time interval must be redefined.

BRIEF SUMMARY OF THE INVENTION

The invention is based on the object of improving a method of the type mentioned in the introduction to the effect that the persistence trails, with little outlay, appear in the radar image in a manner that is highly visible to the observer without overburdening the radar image in the case of a plurality of simultaneously represented targets.

The object is achieved according to the invention by means of the features in patent claim 1.

The method according to the invention has the advantage that it can be carried out using standard graphics cards in a standard screen or video device and, as a result, can be implemented practically without any additional outlay. The persistence trails visible on the screen are very clear and do not overburden or overload the radar image even in the case of a multiplicity of targets appearing on the radar image, since, by virtue of the thinning out of pixels that increases with increasing age, their luminosity diminishes towards that end of the persistence trail which faces away from the current target position.

Expedient embodiments of the method according to the invention with advantageous developments and configurations of the invention emerge from the further claims.

The method according to the invention can be realized in a particularly advantageous manner in that, in accordance with a preferred embodiment of the method, the amplitudes of the radar echoes received by the radar instrument are stored in a radar video memory, whose memory cells are oriented in x,y coordinates, in that the memory content of the radar video memory is written as 1-bit information memory cell by memory cell to at least one trail memory, whose memory cells are oriented in x,y coordinates, in so far as the memory content of the individual memory cells exceeds a first predetermined value, in that the memory content of the trail memory is continuously erased according to an e.g. pseudo-random method for thinning out pixels, in that firstly the memory content of the trail memory is written to an image buffer memory, whose memory cells are oriented in x,y coordinates, and, chronologically succeeding that, the memory content of the radar video memory is written, in so far as the memory contents of the individual memory cells of the radar video memory exceed a second predetermined value, and in that the memory content of the image buffer memory is represented in a continuous manner on the radar screen—oriented in x,y coordinates—of the radar instrument as a pixel per memory cell.

Storing the persistence trails in a special trail memory not only enables the pixels to be thinned out in a particularly simple manner, but also enables, without difficulty, the changeover of the representation mode true-motion to the representation modes relative-motion and relative-motion true trails (center display), in which one's own location, that is to say one's own ship carrying the radar instrument, is fixed in the radar image, preferably in the center thereof, and vice versa, since only the memory content of the trail memory has to be cyclically shifted in accordance with the movement of one's own ship or the addressing of the memory cells of the trail memory has to be cyclically changed in accordance with the movement of one's own ship. If two trail memories are used, no loss of the persistence trails is associated with the changeover, with the result that, unlike in the case of known radar instruments, it is not necessary to accept a waiting time, which lasts at least a plurality of antenna rotations, until the persistence trails reappear on the radar image in the representation mode respectively chosen.

The provision of the additional memories having the same memory size has hardly any appreciable effect on the production costs of a screen device operating according to the method, since memory cards of the required size are extremely inexpensive. Furthermore, a color coding can be achieved in a simple manner using the trail memory, with the result that the persistence trails can also additionally be represented in different colors.

BRIEF DESCRIPTION OF THE FIGURES

The invention is described in more detail below using an exemplary embodiment illustrated in the drawing. In the figures, in a diagrammatic illustration in each case.

DETAILED DESCRIPTION OF THE INVENTION

Figure 1:
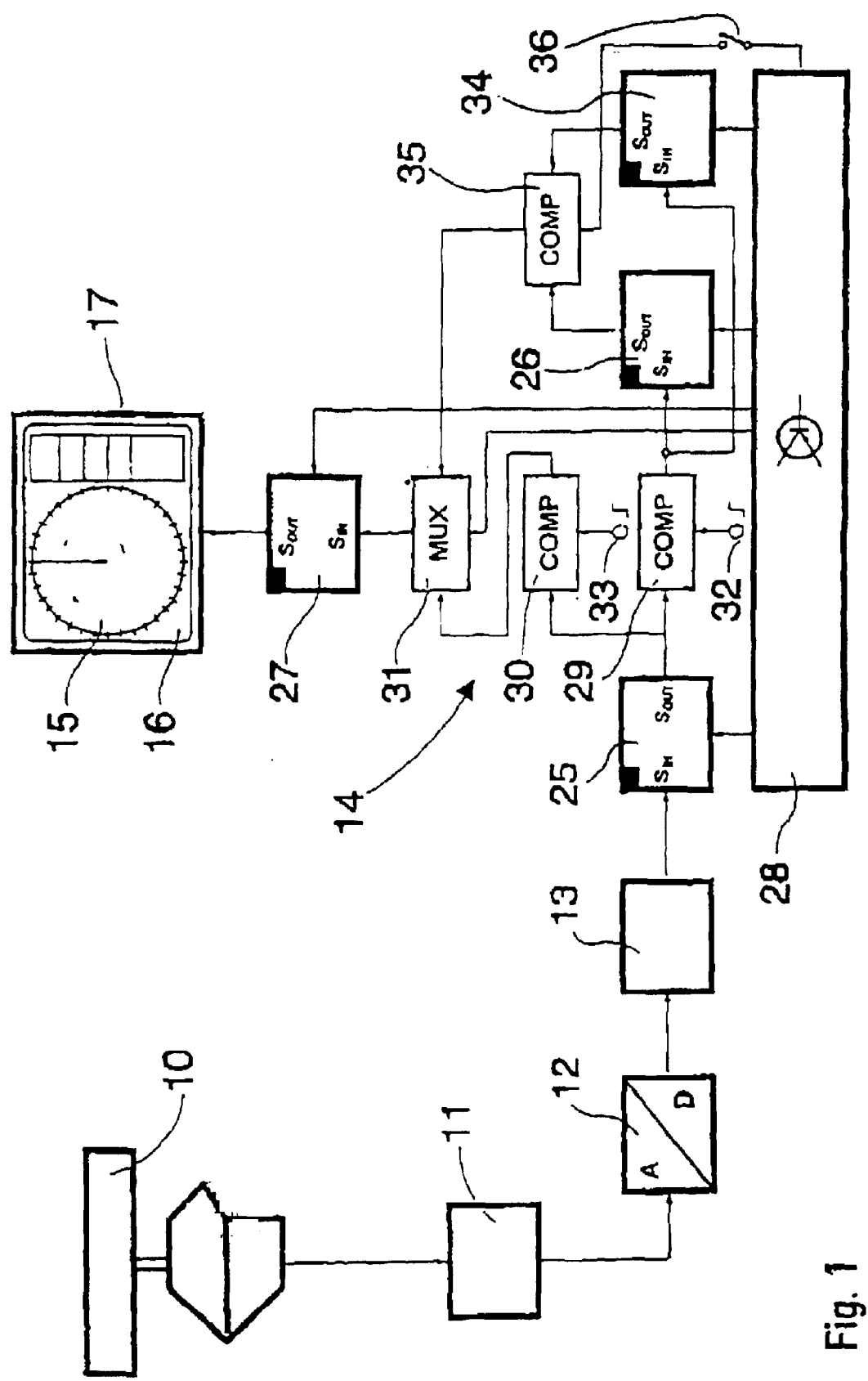
FIG. 1 shows a block diagram of a radar instrument according to an embodiment of the claimed invention.

The radar instrument illustrated as a block diagram in FIG. 1 has a rotating radar antenna 10 in a known manner, which antenna can be used to detect targets according to the principle of radio detection and ranging. Instead of mechanical rotation of the antenna 10, the antenna can also be rotated electronically. Each radio detection and ranging signal, or radar echo, received by the antenna 10 is fed to the receiving device of a transmitting and receiving device 11, is correspondingly conditioned there and converted into digital signals in an analog-to-digital converter 12. The digital signals present in o,φ coordinates (distance and direction-finding) are transformed by a coordinate transformer 13 into an x,y coordinate system and fed to an image generator 14, which represents the position of the targets identified by the radar echoes in a radar image 15 which appears on the radar screen 16 of a screen or video device 17.

Figure 2:
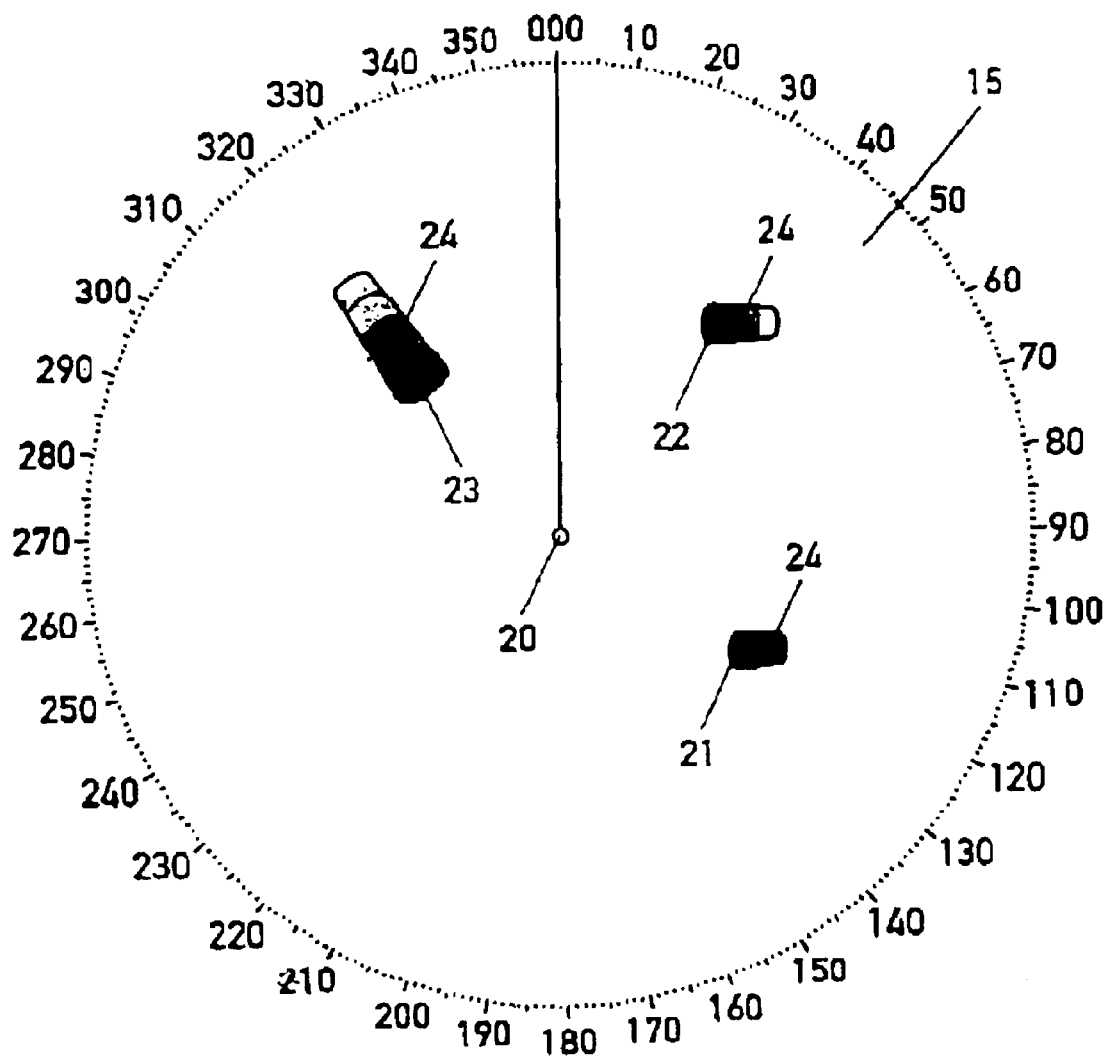
FIG. 2 shows an enlarged illustration of the radar image that can be seen on the screen of the radar instrument in FIG. 1.

A radar image 15 for an arbitrarily chosen scenario is shown enlarged in FIG. 2. The radar image 15 is illustrated in the "relative-motion mode", i.e. the positions of the detected targets are represented in a reference system referring to one's own ship. Therefore, one's own ship, designated by 20 in FIG. 2, is always situated at a fixed point on the radar image 15, in this case in the center of the radar image 15. In the radar image 15 of FIG. 2, the radar instrument detects three different targets 21 to 23, firstly the respective current position of the targets 21 to 23 being represented and, secondly, chronologically preceding target positions of the targets 21 to 23 in each case being represented as a persistence trail 24 identifying the chronological status, so that these persistence trails 24 can provide an overview of the positions of the targets 21 to 23 changing with time. The representation of the persistence trails 24 for the individual targets 21 to 23 is effected in such a way that the current target position of the targets 21 to 23 is made visible by a number of pixels covering a contiguous area in the radar image 15 and the chronologically preceding target positions are represented by a thinning out of pixels in the area, said thinning out increasing with the chronological status of the respective target position, so that the number of pixels activated within the area decreases as the age of the target position increases. This is illustrated in the radar image 15 of FIG. 2 by the fact that the current target positions are in each case occupied by a black area which is increasingly interrupted in a dotted manner at the preceding older target positions. The older the represented target position, the larger the gaps in the closed area on account of the thinning out of pixels, thereby producing for the preceding target positions a dot pattern which becomes increasingly sparse as the age of the respective target position increases.

In order to produce the radar image 15 with the targets 21 to 23 and the persistence trails 24 assigned to each target 21 to 23, the image generator 14 has a radar video memory 25, a trail memory 26, an image buffer memory 27 and a control unit 28 controlling the read-in and read-out processes of the memories 25 to 27. The three memories 25 to 27 are each oriented in x,y coordinates and have an identical memory size with regard to the coordinate range. The radar video memory 25 is connected, on the input side, to the output of the coordinate transformer 13 and, on the output side, to a respective comparison circuit or a comparator 29 and 30.

The trail memory 26 is connected, on the input side, to the output of the first comparator 29 and, on the output side, via a second multiplexer 35, whose function will be explained later, to one input of the multiplexer 31, to whose other input the output of the second comparator 30 is connected. The memory input of the image buffer memory 27 is connected to the output of the multiplexer 31 and the memory output of the image buffer memory 27 is connected to the video device 17. A first comparator threshold 32 is applied to the first comparator 29 and a second comparator threshold 33 is applied to the second comparator 30, the second comparator threshold 33 preferably being made equal to zero. The first comparator 29 is designed in such a way that a 1-bit information item is present at its output if a value present at its input, in this case the memory value of the radar video memory 25, exceeds the first comparator threshold 32. The second comparator 30 is designed in such a way that a value present at its input, in this case the memory value of the radar video memory 25, is present at its output connected to the multiplexer 31 if said value is greater than the second comparator threshold 33. The multiplexer 31, which is controlled by the control unit 28 and has merely the function of a data selector, switches its output periodically and in a chronologically successive manner firstly to its input connected to the trail memory 26 and then to its input connected to the radar video memory 25.

The image generator 14 constructed in this way operates according to the following method:

The amplitudes of the electrical reception signals of the transmitting and receiving device 11, the "video signals or video data", which represent the radar echoes received by the antenna 10 and have been digitized and subjected to signal conditioning, are stored in accordance with their associated x,y coordinates in the correspondingly addressed memory cells of the radar video memory 25. The memory content of the radar video memory 25 is read out cyclically and written as 1-bit information by the first comparator 29 memory cell by memory cell to the trail memory 26, if the memory content of the individual memory cell exceeds the first comparator threshold 32. As a result, all the memory cells of the radar video memory 25 in which the stored amplitude is greater than the first comparator threshold are cyclically copied as 1-bit information to the trail memory 26. For a color representation of the persistence trails on the radar image 15, during the writing process the 1-bit information is additionally coded in such a way that its coding can be clearly distinguished from the coding of the memory content of the radar video memory 25. During the copying or writing operation, the content of the trail memory 26 is not erased but only overwritten. If the amplitude in a memory cell of the radar video memory 25 is less than the first comparator threshold 32, then there is no occupancy of the identically addressed memory cell in the trail memory 26. The memory content of the memory cells of the trail memory 26 is continually erased by a method for thinning out pixels, e.g. a pseudo-random method. In this case, the erasure frequency is independent of the frequency of writing to the trail memory 26, in which case, by altering the erasure frequency, the length of the persistence trail produced can be chosen independent of the rotational speed of the radar antenna.

Figure 3A:
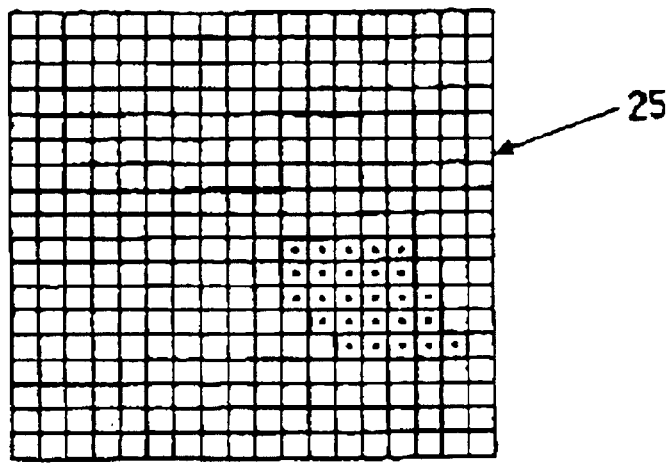
FIG. 3 shows an illustration of the memory content of a trail memory in the radar instrument in accordance with FIG. 1 at three successive instants.
Figure 3B:
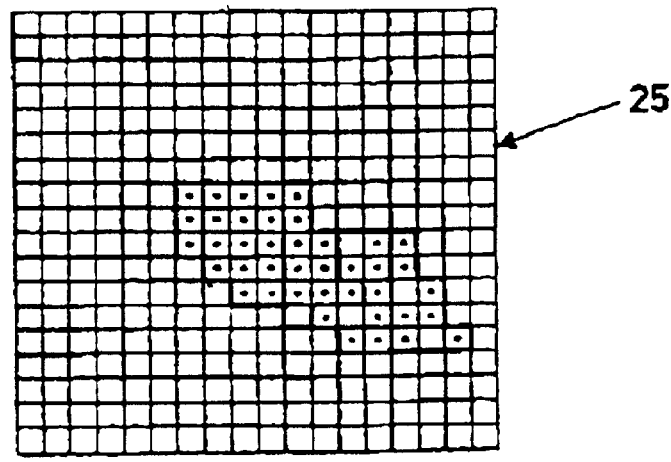
Figure 3C:
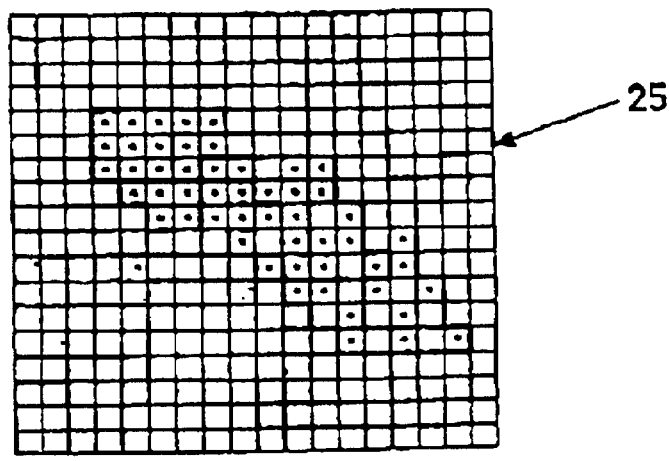

FIG. 3 illustrates the construction of such a persistence trail 24 in three phases. FIG. 3a shows the trail after the initiation phase as copied from the radar video memory 25. In FIG. 3b, the target has moved on somewhat. The trail image at the current position is still closed, while the trail image at the position from the initiation phase has been thinned out by approximately 20% by the erasure method employed. In FIG. 3c, the target has once again moved on somewhat, so that now three regions can be discerned. The trail is closed in the front region of the trail, that is to say the direct, current target position. The memory content is thinned out by approximately 20% in the middle region of the trail and by approximately 40% in the rear region.

The memory contents of trail memory 26 and radar video memory 25 are copied into the image buffer memory 27 cyclically and chronologically successively in the order mentioned, the second comparator 30 performing sorting such that the memory content of the radar video memory 25 is written, and if appropriate overwrites pixels previously written from the trail memory 26, only if the memory contents of the individual memory cells of the radar video memory 25 exceed the second predetermined value. In this case, the multiplexer 31 controlled by the control unit 28 connects the respective output of trail memory 26 and radar video memory 25 to the memory input of the image buffer memory 27 in a chronologically correct manner. The memory content now copied in this way into the image buffer memory 27 is a mapping of the radar image 15 which is to be presently represented on the radar screen 16 and is cyclically renewed and is represented in a continuous manner on the radar screen 16.

The multiplexer 31 can be dispensed with and the outputs of trail memory 26 and comparator 30 can be connected directly to the memory input of the image buffer memory 27 if a corresponding control routine is provided in the control unit 28, which control routine effects the read-out of trail memory 26 and radar video memory 25 in the manner described above.

As already mentioned, the image representation is effected in relative motion. If it is to be performed in relative-motion true trails, then the content of the trail memory 26 has to be cyclically shifted or a readdressing of the memory cells of the trail memory 26 has to be performed, said readdressing compensating the intrinsic movement of the ship carrying the radar instrument.

In order, in the event of changeover between the representation modes, which can be performed arbitrarily by the operator, to avoid the loss of the persistence trails, which are built up again after a changeover operation only after a relatively long time lasting a plurality of antenna revolutions, a second trail memory 34 is provided, whose memory input is likewise connected to the output of the first comparator 29. As a result, the 1-bit information items are simultaneously copied into both trail memories 36, 34, in which case, however, when the 1-bit information items are written to the second trail memory 36, the control unit 28 carries out a readdressing of the memory cells, said readdressing being important for the true-motion representation, in such a way that the movement of one's own ship is spatially compensated in the x,y coordinate system. As a result, the trail is built up in relative motion in the first trail memory 26 and in true motion in the second trail memory 34, to be precise at the same time. The second trail memory 34 is processed in parallel by the control unit 28 in the same way, so that its memory content is continuously erased routinely according to the same method and the above-described thinning out of pixels is effected in the memory content representing the persistence trails 24. In the event of a changeover of the representation mode on the radar screen 16, it is now optionally possible to have recourse to the first trail memory 26 and to the second trail memory 34, and the persistence trails 24 can thus be represented in relative motion or true motion on the radar screen 16.

For optional access to the two memory outputs of the trail memories 26 and 34, the latter are connected to the two inputs of a second multiplexer 35, whose output is connected to one input of the first multiplexer 31. The second multiplexer 35 is controlled by means of a changeover switch 36 that can be operated manually. In this case, if the changeover switch 36 assumes the switching position indicated diagrammatically in FIG. 1, then in the multiplexer 35, the output thereof is connected to the input connected to the first trail memory 26. If the changeover switch 36 is closed, then the output of the multiplexer 35 is connected to the input connected to the second trail memory 34.

What is claimed is:

1. A method for producing a persistence trail for at least one target having a current target position and one or more previous target positions, wherein the current target position is represented in a continuous manner in a radar image of a radar instrument, and the current target position is made visible by a number of pixels covering a contiguous area in the radar image, and wherein the previous target positions are represented by a thinning out of pixels in the radar image, the thinning out increasing with increasing age of the respective target position, the method comprising:

(a) storing amplitudes of radar echoes received by the radar instrument in a radar video memory;
   (b) writing the content of the radar video memory as a 1-bit item of information to at least one trail memory; and,
   (c) erasing the trail memory by a method for thinning out pixels in a chronologically successive manner when the content of individual trail memory cells exceeds a first predetermined value, comprising:
      (i) writing the content of the trail memory to an image buffer memory, and subsequently
      (ii) writing the content of the radar video memory to the image buffer memory when the contents of individual memory cells of the radar video memory exceed a second predetermined value;
   wherein the radar video memory, trail memory, and image buffer memory all have memory cells which are oriented in x,y coordinates, and
   wherein the image buffer memory is represented in a continuous manner on the radar image as a pixel per memory cell.

2. The method as claimed in claim 1, wherein the second predetermined value is set to zero.

3. The method as claimed in claim 1, wherein the trail memory has a read-in and a read-out frequency and is erased at a frequency that is independent of the read-in/out frequency of the trail memory.

4. The method as claimed in claim 1, wherein the 1-bit item of information is coded differently from the coding of the radar video memory.

5. The method as claimed in claim 4, wherein coding of the 1-bit item of information is carried out during the process of writing to the trail memory.

6. The method as claimed in claim 1, wherein the 1-bit item of information is written simultaneously to two trail memories.

7. The method according to claim 1, wherein the pixels are thinned out by a pseudo-random method.

8. The method according to claim 1, further comprising readdressing the memory cells in the x,y coordinate system to compensate for any movement of the radar instrument when the 1-bit item of information is written to or read from one trail memory.

9. The method according to claim 8, wherein the content of one trail memory is written to the image buffer memory.

10. An apparatus for producing a persistence trail for at least one target having a current target position and one or more previous target positions, wherein the current target position is represented in a continuous manner in a radar image of a radar instrument, and the current target position is made visible by a number of pixels covering a continuous area in the radar image, and wherein the previous target positions are represented by a thinning out of pixels in the radar image, the tinning out increasing with increasing age of the respective target position, the apparatus comprising:

(a) a radar video memory which is connected to a receiving device of the radar instrument, and stores amplitudes of radar echoes obtained from the receiving device;

(b) at cast one trail memory;

(c) an image buffer memory having an input connected to an output of the trial memory, wherein the radar video memory, trail memory, and image buffer memory all have inputs and outputs which are oriented in x,y coordinates and have the same memory size in the x,y coordinate range;

(d) two comparators having inputs and outputs, wherein:
   (i) the inputs are connected to the output of the radar video memory, and the output of the first comparator is connected to the input of the trail memory, and the first comparator outputs a 1-bit item of information when an input value exceeds a first comparator threshold; and
   (ii) the output of the second comparator is connected to the input of the image buffer memory, and when an input value exceeds a second comparator threshold, the second comparator switches the input value to its output; and (e) a control unit for controlling and updating the radar video memory, trail memory, and image buffer memory, wherein the control unit:
   (i) continuously erases the content of the trail memory by a method for thinning out pixels, and
   (ii) controls the read-in and read-out processes of the memories, wherein the content of the trail memory and then the content of the radar video memory are read into the image buffer memory.

11. The apparatus as claimed in claim 10, comprising two trail memories having inputs connected to the output of the first comparator, wherein the control unit controls the operations of:
   (i) writing the 1-bit information item present at the output of the first comparator to one trail memory, and
   (ii) reading the stored 1-bit item of information from one trail memory, in order to readdress the memory cells in the x,y coordinate system and thereby compensate for any movement of the radar instrument; and the input of the image buffer memory is connected to one of the two trail memories.

12. The apparatus as claimed in claim 11, wherein the connection of the image buffer memory to the trail memories is initiated manually.

13. The apparatus according to claim 10, wherein the pixels are thinned out by a pseudo-random method.

* * * * *

UNITED STATES PATENT AND TRADEMARK OFFICE
CERTIFICATE OF CORRECTION

PATENT NO. : 6,522,289 B1
DATED : February 18, 2003
INVENTOR(S) : Frerichs et al.

It is certified that error appears in the above-identified patent and that said Letters Patent is hereby corrected as shown below:

Column 7,
Line 16, delete "cast" and substitute therefor -- least --.

Signed and Sealed this

Seventeenth Day of June, 2003

JAMES E. ROGAN
*Director of the United States Patent and Trademark Office*